US012678811B2

(12) United States Patent
Fu

(10) Patent No.: US 12,678,811 B2
(45) Date of Patent: Jul. 14, 2026

(54) ELECTRIC JET TANK

(71) Applicant: Cong Zhang, Xiangtan (CN)

(72) Inventor: Yunbo Fu, Chongqing (CN)

(73) Assignee: Cong Zhang, Xiangtan (CN)

( * ) Notice: Subject to any disclaimer, the term of this patent is extended or adjusted under 35 U.S.C. 154(b) by 232 days.

(21) Appl. No.: 18/671,261

(22) Filed: May 22, 2024

(65) Prior Publication Data

US 2024/0342733 A1 Oct. 17, 2024

Related U.S. Application Data

(63) Continuation of application No. PCT/CN2024/085829, filed on Apr. 3, 2024.

(30) Foreign Application Priority Data

Apr. 12, 2023 (CN) ........................ 202320810246.X

(51) Int. Cl.
*B05B 7/24* (2006.01)

(52) U.S. Cl.
CPC .......... *B05B 7/2418* (2013.01); *B05B 7/2429* (2013.01)

(58) Field of Classification Search
CPC ... B05B 7/2416; B05B 7/2429; B05B 7/2418; B05B 5/025
See application file for complete search history.

(56) References Cited

U.S. PATENT DOCUMENTS 3,565,344 A * 2/1971 Takei .................... F04B 17/042 239/332
4,154,375 A * 5/1979 Bippus ................. H01H 3/0206 200/61.86
5,192,009 A * 3/1993 Hildebrandt .......... B05B 7/0433 239/113

(Continued)

FOREIGN PATENT DOCUMENTS

AU 2001100320 A4 10/2001
CN 107685934 A 2/2018
CN 208319753 U 1/2019

(Continued)

OTHER PUBLICATIONS

International Search Report and Written Opinion issued in corresponding PCT Application No. PCT/CN2024/085829, dated Jul. 4, 2024.

*Primary Examiner* — Nathan C Zollinger
(74) *Attorney, Agent, or Firm* — Westbridge IP LLC

(57) ABSTRACT

An electric jet tank includes a cylindrical housing, the housing is provided with an air inlet hole, a miniature air pump is installed in the housing, an air outlet of the miniature air pump is arranged on a top surface of the miniature air pump, the top surface of the miniature air pump is provided with a pressing switch; the pressing switch includes two ends which are accessible or separable, one of which is a sleeve sleeved to an outside of the air outlet and fixedly arranged on the top surface, and the other end is a pressing portion arranged on a top of the sleeve, an elastic member is arranged between the pressing portion and the top surface; the sleeve and the pressing portion are electrically conductive. The present disclosure has the characteristics of simple structure, small size, portability, and convenient to use.

9 Claims, 5 Drawing Sheets

(56) References Cited

U.S. PATENT DOCUMENTS

| | | | | |
|---|---|---|---|---|
| 11,590,520 | B2 * | 2/2023 | Seeberger | B05B 7/2429 |
| 2007/0138316 | A1 * | 6/2007 | Iyengar | A62C 13/64<br>239/398 |

FOREIGN PATENT DOCUMENTS

| | | | |
|---|---|---|---|
| CN | 209607632 | U | 11/2019 |
| CN | 219664053 | U | 9/2023 |
| KR | 20180002710 | U | 9/2018 |

* cited by examiner

ELECTRIC JET TANK

CROSS-REFERENCE TO RELATED APPLICATIONS

The present disclosure is a continuation of International Application No. PCT/CN2024/085829, filed on Apr. 3, 2024, which claims priority to Chinese Patent Application No. 202320810246.X, filed on Apr. 12, 2023. All of the aforementioned applications are incorporated herein by reference in their entireties.

TECHNICAL FIELD

The present disclosure herein relates to the technical field of spraying equipment, and specifically relates to an electric jet tank.

BACKGROUND

In life, there are many scenarios that require the use of spraying equipment, such as interior decoration, furniture refinishing, etc. In the prior art, a disposable jet tank is commonly used to spray paint with painting bottle due to its compact size, portability, light weight, and one-handed grip characteristics. The disposable jet tank has a simple structure and is cylindrical in shape, with compressed air inside the tank, the top of the jet tank is provided with a valve pressing switch to which the external spraying nozzle with painting bottle is installed, when using, press the button on the external spraying nozzle, the button squeezes the valve pressing switch, open the valve, the compressed air sprayed upwards from the jet tank sprayed towards the side by the flow channel guided inside the external spraying nozzle, high speed and low-pressure airflow flow through the top of the painting bottle, and the paint is sucked out and sprayed out to the side with the high-speed airflow; however, this disposable jet tank internal gas can only be used continuously for about 5 minutes, the duration of a short period of time, need to replace the jet tank after use, the old jet tank is usually thrown away directly, cannot be recycled, resulting in a waste of resources. In the prior art, there are some electric paint spraying equipment, although can be recharged and recycled, but such equipment often have complex structure, large size, and are not easy to carry, and cannot be as compact, portable, and convenient to use as disposable jet tank.

SUMMARY

The purpose of the present disclosure is: to provide an electric jet tank in response to the problem that the electric paint spraying equipment in the prior art is large and heavy, and is not easy to carry.

In order to achieve the above purpose, the technical solutions used in the present disclosure are as follows.

An electric jet tank comprises a cylindrical housing, the housing is provided with an air inlet hole, a miniature air pump and a mobile power supply are installed in the housing, an air outlet of the miniature air pump is arranged on a top surface of the miniature air pump, the top surface of the miniature air pump is provided with a pressing switch, the mobile power supply, the pressing switch and the miniature air pump form a closed circuit loop; the pressing switch comprises two ends which are accessible or separable, one of which is a sleeve sleeved to an outside of the air outlet and fixedly arranged on the top surface, and the other end is a pressing portion arranged on a top of the sleeve, an elastic member is arranged between the pressing portion and the top surface; the sleeve and the pressing portion are electrically conductive; a middle of the pressing portion is provided with a vertical ventilation hole, a top of the housing is provided with an aperture, the pressing portion is sliding installed in the aperture.

The present disclosure adopts the aforementioned technical solution, by designing the electric jet tank with the above structure, it is possible to directly install the standard structure of external spraying nozzle with painting bottle in the prior art on the pressing portion, press the button to squeeze the pressing portion downward, at the same time, the elastic member is compressed, when the pressing portion is in contact with the sleeve, the pressing switch is closed, the circuit is connected, the miniature air pump is activated and the high-speed airflow from the air outlet flows through the ventilation hole into the flow channel of the external spraying nozzle, and is guided and sprayed out from the side to spray paint together with the paint in the painting bottle; after releasing the button, the elastic member reset the pressing portion and the sleeve to separate and disengage, the pressing switch is opened, the circuit is disconnected, and the miniature air pump stops working; in this way, the function of the electric air spraying has been realized, and it can be used in the charging cycle of the mobile power supply; at the same time, this electric jet tank is the same as the disposable jet tank in terms of its cylindrical appearance, the method of spraying paint by pressing; compared to the problems of complex structure, large size, and inconvenient portability of electric paint spraying equipment in prior art, the electric jet tank of the present disclosure has a simple structure, small size, and is cylindrical in shape with the disposable jet tank, moreover, it can be matched with external spraying nozzle with painting bottle that are only used in conjunction with disposable jet tank in the prior art, making its spray painting usage method the same as disposable jet tank; it has the characteristics of simple structure, small size, portability, and convenient to use.

Furthermore, the pressing portion comprises a ring-shaped gasket and a hollow pressing rod, a convex ring is formed on a bottom side of the pressing rod, the elastic member is cylindrical, and sleeved between the air outlet and the sleeve, the height of the elastic member is greater than the height of the sleeve; the convex ring pressing the gasket against a top of the elastic member; a central axis of the pressing rod, the convex ring, the gasket, the elastic member, the sleeve and the air outlet are co-linear, by setting the pressing portion to the above structure, the closing and disconnecting functions of the pressing switch can be effectively realized, and the structure is simple and easy to manufacture.

Furthermore, the convex ring comprises a first convex ring and a second convex ring, the first convex ring having a larger diameter than the second convex ring, and the top of the elastic member and the gasket are both sleeved on the second convex ring, whereby the gasket and the elastic member can play a radial positioning role and facilitate installation.

Furthermore, the elastic member is a rubber tube or a spring.

Furthermore, it further comprises a first flexible conductor and a second flexible conductor, the first flexible conductor is used for connecting the sleeve to the circuit and the second flexible conductor is used for connecting the gasket to the circuit, the flexible conductor ensures that the sleeve and the gasket are electrically connected to any location within the housing.

Furthermore, the first flexible conductor and the second flexible conductor are wires or metal shrapnel.

Furthermore, the housing comprises a main housing and a bottom cover, the bottom cover is clamped at a bottom of the main housing, the bottom cover is provided so that the various main body portions can enter the main housing for assembly and convenient later overhaul.

Furthermore, edges of an opening at the bottom of the main housing is provided with a plurality of curved clamping slots arranged at circumferential intervals, the bottom cover comprises a connected bottom cover bottom plate and an annular bottom cover side plate, and an inner side of the bottom cover side plate is provided with a plurality of locking connecting pieces corresponding to the curved clamping slots one by one.

Furthermore, a mounting base is arranged between the miniature air pump and the mobile power supply, the mounting base comprises a mounting base bottom plate and a plurality of clamping blocks, the clamping blocks arranged at circumferential intervals along the mounting base bottom plate, an accommodating cavity is formed between the clamping blocks and the mounting base bottom plate, a bottom of the miniature air pump is embedded in the accommodating cavity, an outer wall of the clamping blocks are in contact with an inner wall surface of the main housing, and the mounting base is used to radially limit the bottom of the miniature air pump to prevent it from wobbling during use.

Compared with the prior art, the beneficial effects of the present disclosure are: simple structure, small size, and is cylindrical in shape with the disposable jet tank, moreover, it can be matched with external spraying nozzle with painting bottle that are only used in conjunction with disposable jet tank in the prior art, making its spray painting usage method the same as disposable jet tank; it has the characteristics of simple structure, small size, portability, and convenient to use.

DETAILED DESCRIPTION OF THE EMBODIMENTS

Figure 1:
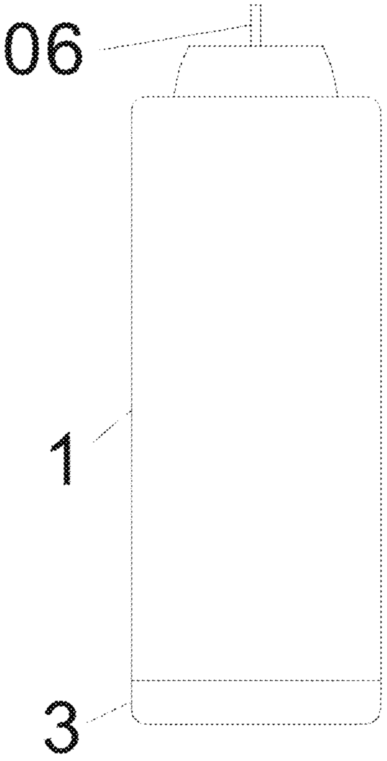
FIG. 1 shows a schematic diagram of the structure of the present disclosure.
Figure 2:
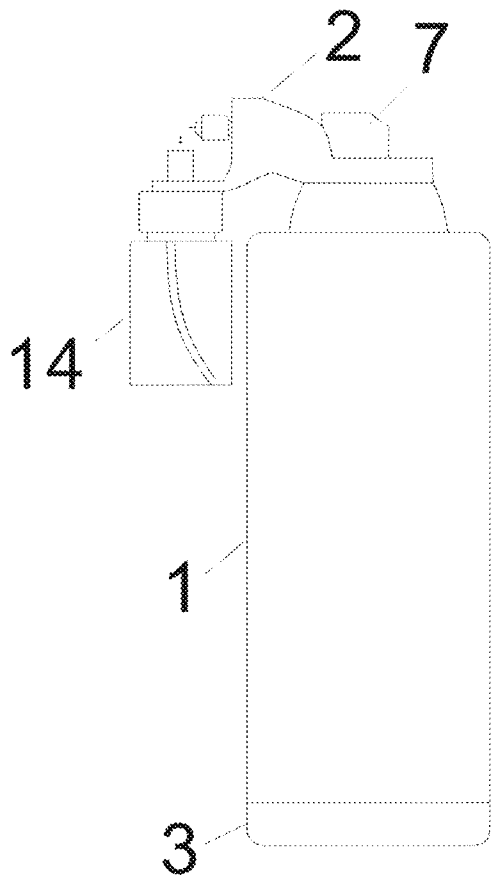
FIG. 2 shows a schematic diagram of the assembly of the external spraying nozzle with a painting bottle in the present disclosure.
Figure 3:
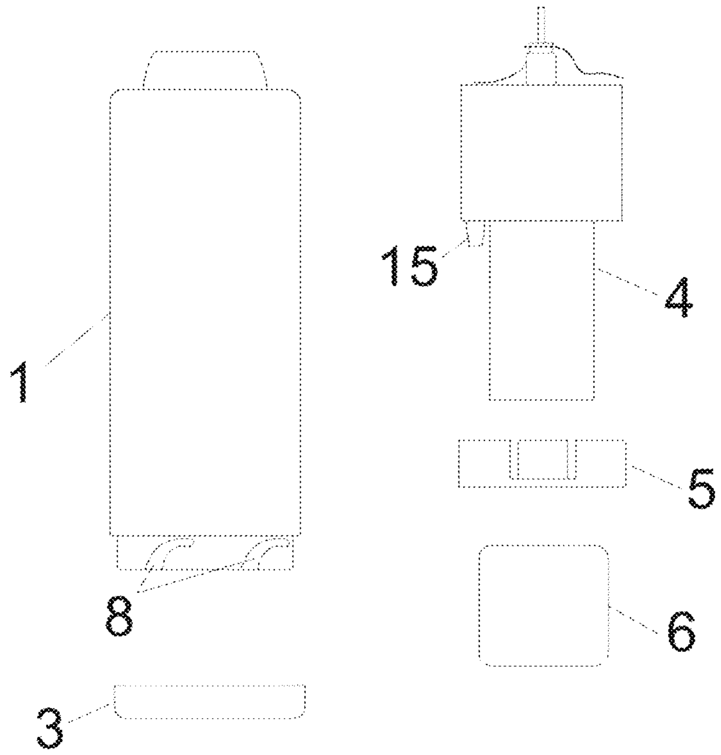
FIG. 3 shows an exploded view of the present disclosure.
Figure 4:
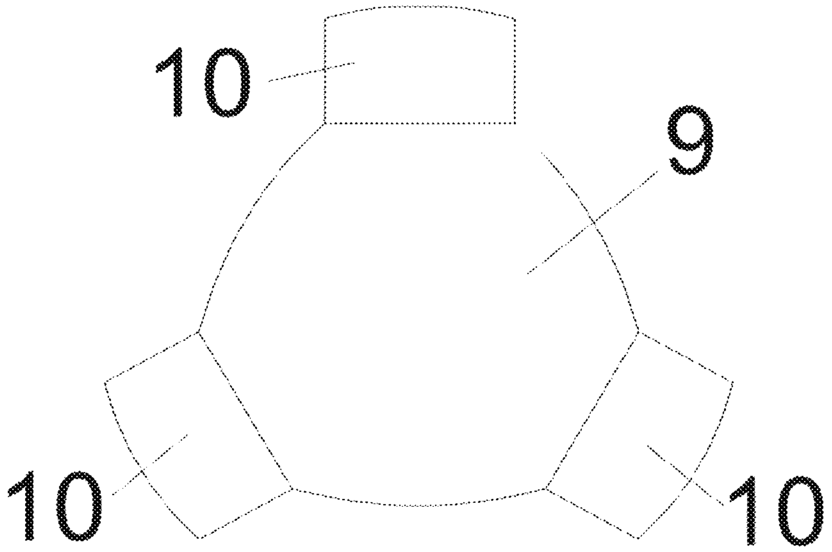
FIG. 4 shows a top view of a mounting base.
Figure 5:
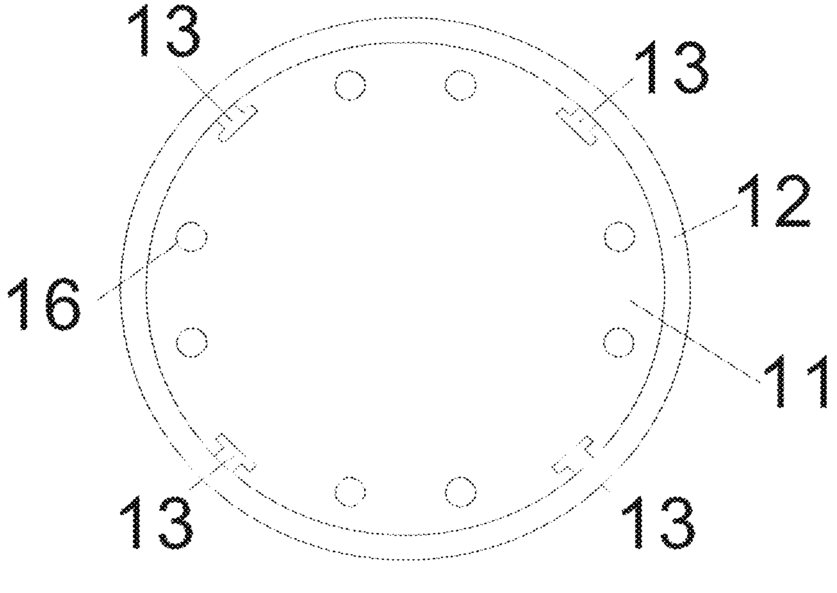
FIG. 5 shows a top view of a bottom cover.
Figure 6:
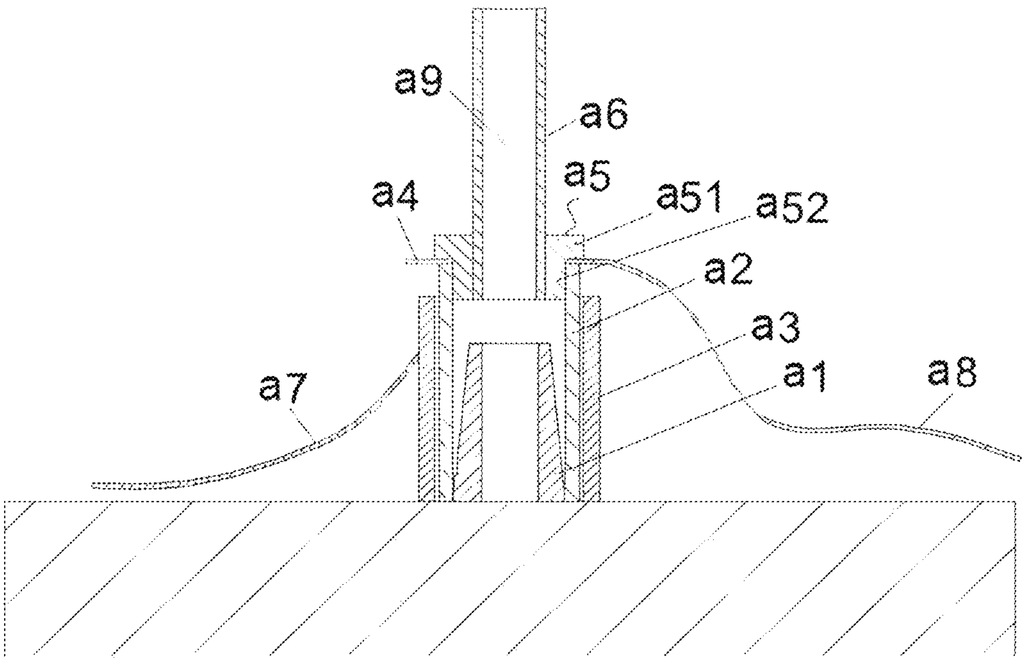
FIG. 6 shows a sectional view of a pressing switch.

The present disclosure is described in detail below in conjunction with the accompanying drawings.

In order to make the objects, technical solutions and advantages of the present disclosure more clearly understood, the following is a further detailed description of the present disclosure in conjunction with the accompanying drawings and embodiments. It should be understood that the specific embodiments described herein are for the purpose of explaining the present disclosure only and are not intended to limit the present disclosure.

An electric jet tank comprises a cylindrical housing, the housing is provided with an air inlet hole 16, a miniature air pump 4 and a mobile power supply 6 are installed in the housing, an air outlet a1 of the miniature air pump 4 is arranged on a top surface of the miniature air pump 4, the top surface of the miniature air pump 4 is provided with a pressing switch, the mobile power supply 6, the pressing switch and the miniature air pump 4 form a closed circuit loop; the pressing switch comprises two ends which are accessible or separable, one of which is a sleeve a3 sleeved to an outside of the air outlet a1 and fixedly arranged on the top surface, and the other end is a pressing portion arranged on a top of the sleeve a3, an elastic member is arranged between the pressing portion and the top surface of the miniature air pump 4; the sleeve a3 and the pressing portion are electrically conductive; a middle of the pressing portion is provided with a vertical ventilation hole a9, a top of the housing is provided with an aperture, the pressing portion is sliding installed in the aperture; when the pressing switch is closed, the miniature air pump 4 can be electrically operated when the pressing portion is in contact with the sleeve a3, and air flows in from the air inlet hole 16, and then is sucked into the suction port 15 of the miniature air pump 4, and the high-speed airflow sprayed out from the air outlet a1 after the action of the miniature air pump 4.

In this embodiment, the pressing portion comprises a ring-shaped gasket a4 and a hollow pressing rod a6, a convex ring a5 is formed on a bottom side of the pressing rod a6, the elastic member is cylindrical, and sleeved between the air outlet a1 and the sleeve a3, the height of the elastic member is greater than the height of the sleeve a3; the convex ring a5 pressing the gasket a4 against a top of the elastic member; a central axis of the pressing rod a6, the convex ring a5, the gasket a4, the elastic member, the sleeve a3 and the air outlet a1 are co-linear; the gasket a4 and the sleeve a3 are made of electrically conductive material, preferably metal; the convex ring a5 comprises a first convex ring a51 and a second convex ring a52, the first convex ring a51 having a larger diameter than the second convex ring a52, and the top of the elastic member and the gasket a4 are both sleeved on the second convex ring a52; the elastic member is a rubber tube a2 or a spring; in this embodiment, it is a rubber tube a2, and the top and bottom of the rubber tube a2 are sleeved on the second convex ring a52 and the air outlet a1, respectively, whereby the area between the air outlet a1 and the ventilation hole a9 is enclosed into a closed space to prevent air leakage; if the elastic member is selected to be a spring, it is preferred to apply insulating paint on the spring to prevent it from inadvertently contacting the sleeve a3 to cause the loop of the pressing switch to be connected in the open state, moreover, if the elastic member is a spring, when the gasket a4 is moved downwards under pressure and comes into contact with the sleeve a3, the area between the air outlet a1 and the ventilation hole a9 is enclosed into a closed space, ensuring that all airflow from the air outlet a1 flows into the ventilation hole a9 to avoid air leakage;

The specific structure and setting method of the pressing portion and the elastic member is not unique, for example, the pressing portion may also be provided as a pressing rod with a pressure disk on the circumferential side, the pressing rod is a hollow structure, the pressing rod and the pressure disk are integrally molded metal, the pressure disk is round or square, the elastic member is a plurality of springs of the same specifications, circumferentially evenly distributed and supported between the edges of the pressure disk and the top surface of the miniature air pump, and these plurality of springs are all provided on the outer side of the sleeve a3 along the radial direction, when these springs are only acted upon by the gravity of the pressing portion, there is a spacing between the pressure disk and the sleeve a3, and the pressure disk is brought into contact with the upper end surface of the sleeve a3 by pressing the pressing rod, this pressing switch is closed, the electric circuit loop is connected, and the miniature air pump is started.

In this embodiment, it further comprises a first flexible conductor a7 and a second flexible conductor a8, the first flexible conductor is used for connecting the sleeve to the circuit and the second flexible conductor is used for connecting the gasket to the circuit; the first flexible conductor a7 and the second flexible conductor a8 are wires or metal shrapnel, and the first flexible conductor a7 is welded to the sleeve 3 and the second flexible conductor a8 is welded to the gasket a4.

The housing comprises a main housing 1 and a bottom cover 3, the bottom cover 3 is clamped at a bottom of the main housing 1; edges of an opening at the bottom of the main housing 1 is provided with a plurality of curved clamping slots 8 arranged at circumferential intervals, the bottom cover 3 comprises a connected bottom cover bottom plate 11 and an annular bottom cover side plate 12, and an inner side of the bottom cover side plate 12 is provided with a plurality of locking connecting pieces 13 corresponding to the curved clamping slots 8 one by one; when it is necessary to close the bottom cover 3 onto the main housing 1, the locking connecting piece 13 is first aligned with the opening of the curved clamping slot 8, and then the bottom cover 3 is rotated, whereby the locking connecting piece 13 is clamped at the end of the curved clamping slot 8.

A mounting base 5 is arranged between the miniature air pump 4 and the mobile power supply 6, the mounting base 5 comprises a mounting base bottom plate 9 and a plurality of clamping blocks 10, the clamping blocks 10 arranged at circumferential intervals along the mounting base bottom plate 9, and an accommodating cavity is formed between the clamping blocks 10 and the mounting base bottom plate 9, a bottom of the miniature air pump 4 is embedded in the accommodating cavity, an outer wall of the clamping blocks 10 are in contact with an inner wall surface of the main housing 1; in particular, there are three clamping blocks 10, which are evenly distributed in the circumferential direction of the mounting base bottom plate 9.

The housing of this electric jet tank is provided with a charging port, which can be used with a charger to charge the mobile power supply 6; there are a total of 8 air inlet holes 16, which are provided along the circumference on the bottom cover bottom plate 11 near the edge.

The present disclosure adopts the aforementioned technical solution, by designing the electric jet tank with the above structure, it is possible to directly install the standard structure of external spraying nozzle 2 with painting bottle 14 in the prior art on the pressing portion, press the button 7 to squeeze the pressing portion downward, at the same time, the elastic member is compressed, when the pressing portion is in contact with the sleeve a3, the pressing switch is closed, the circuit is connected, the miniature air pump 4 is activated and the high-speed airflow from the air outlet a1 flows through the ventilation hole into the flow channel of the external spraying nozzle 2, and is guided and sprayed out from the side to spray paint together with the paint in the painting bottle 14; after releasing the button, the elastic member reset the pressing portion and the sleeve a3 to separate and disengage, the pressing switch is opened, the circuit is disconnected, and the miniature air pump 4 stops working; in this way, the function of the electric air spraying has been realized, and it can be used in the charging cycle of the mobile power supply; at the same time, this electric jet tank is the same as the disposable jet tank in terms of its cylindrical appearance, the method of spraying paint by pressing; compared to the problems of complex structure, large size, and inconvenient portability of electric paint spraying equipment in prior art, the electric jet tank of the present disclosure has a simple structure, small size, and is cylindrical in shape with the disposable jet tank, moreover, it can be matched with external spraying nozzle with painting bottle that are only used in conjunction with disposable jet tank in the prior art, making its spray painting usage method the same as disposable jet tank; it has the characteristics of simple structure, small size, portability, and convenient to use.

The foregoing are merely better embodiments of the present disclosure and are not intended to limit the present disclosure, and any modifications, equivalent substitutions, improvements, etc., made within the spirit and principles of the present disclosure shall be included in the scope of protection of the present disclosure.

What is claimed is:

1. An electric jet tank comprising a cylindrical housing, wherein the housing is provided with an air inlet hole, and a miniature air pump and a mobile power supply are installed inside the housing, wherein an air outlet of the miniature air pump is arranged on a top surface of the miniature air pump, and the top surface of the miniature air pump is provided with a pressing switch, wherein the mobile power supply, the pressing switch and the miniature air pump form a closed circuit loop;

the pressing switch comprises two ends which are separable, one end is a sleeve sleeved to an outside of the air outlet and fixedly arranged on the top surface, and the other end is a pressing portion arranged on a top of the sleeve, an elastic member is arranged between the pressing portion and the top surface; and the sleeve and the pressing portion are electrically conductive; a middle of the pressing portion is provided with a vertical ventilation hole, a top of the housing is provided with an aperture, and the pressing portion is slidingly installed in the aperture; wherein the pressing portion comprises a ring-shaped gasket and a hollow pressing rod, a convex ring is formed on a bottom side of the pressing rod; and the elastic member is cylindrical and sleeved between the air outlet and the sleeve.

2. The electric jet tank according to claim 1, wherein the height of the elastic member is greater than the height of the sleeve; the convex ring pressing the gasket against a top of the elastic member; wherein a central axis of the pressing rod, the convex ring, the gasket, the elastic member, the sleeve and the air outlet are coaxial.

3. The electric jet tank according to claim 2, wherein the convex ring comprises a first convex ring and a second convex ring, the first convex ring having a larger diameter than the second convex ring, and the top of the elastic member and the gasket are both sleeved on the second convex ring.

4. The electric jet tank according to claim 2, wherein the elastic member is a rubber tube or a spring.

5. The electric jet tank according to claim 2, further comprising a first flexible conductor and a second flexible conductor, wherein the first flexible conductor is used for connecting the sleeve to the circuit and the second flexible conductor is used for connecting the gasket to the circuit.

6. The electric jet tank according to claim 5, wherein the first flexible conductor and the second flexible conductor are wires or metal protrusions.

7. The electric jet tank according to claim 1, wherein the housing comprises a main housing and a bottom cover, the bottom cover is clamped at a bottom of the main housing.

8. The electric jet tank according to claim 7, wherein an edge of an opening at the bottom of the main housing is provided with a plurality of curved clamping slots arranged at circumferential intervals, the bottom cover comprises a connected bottom cover bottom plate and an annular bottom cover side plate, and an inner side of the bottom cover side plate is provided with a plurality of locking connecting pieces corresponding to the curved clamping slots one by one.

9. The electric jet tank according to claim 7, wherein a mounting base is arranged between the miniature air pump and the mobile power supply, the mounting base comprises a mounting base bottom plate and a plurality of clamping blocks, the clamping blocks arranged at circumferential intervals along the mounting base bottom plate, and an accommodating cavity is formed between the clamping blocks and the mounting base bottom plate, a bottom of the miniature air pump is embedded in the accommodating cavity, an outer wall of the clamping blocks are in contact with an inner wall surface of the main housing.

* * * * *